United States Patent
Felder et al.

(10) Patent No.: US 7,501,794 B2
(45) Date of Patent: Mar. 10, 2009

(54) SYSTEM, METHOD AND SEMICONDUCTOR DEVICE FOR CHARGING A SECONDARY BATTERY

(75) Inventors: Matthew Felder, Austin, TX (US); Russell A. Schultz, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 336 days.

(21) Appl. No.: 11/015,538

(22) Filed: Dec. 17, 2004

(65) Prior Publication Data
US 2006/0132091 A1 Jun. 22, 2006

(51) Int. Cl.
H02J 7/00 (2006.01)
H02J 7/04 (2006.01)
H02J 7/06 (2006.01)
H02J 7/16 (2006.01)

(52) U.S. Cl. .................. 320/128; 320/104; 320/118; 320/132; 320/134; 320/149; 320/162; 320/163; 320/164

(58) Field of Classification Search ............ 320/128, 320/104, 118, 132, 134, 149, 162–164
See application file for complete search history.

(56) References Cited

U.S. PATENT DOCUMENTS

| | | | |
|---|---|---|---|
| 5,352,967 A | | 10/1994 | Nutz et al. |
| 5,408,170 A | * | 4/1995 | Umetsu et al. ............ 320/148 |
| 5,477,124 A | | 12/1995 | Tamai |
| 5,617,007 A | | 4/1997 | Keidl et al. |
| 5,670,863 A | * | 9/1997 | Broell et al. ............ 320/145 |
| 5,726,554 A | * | 3/1998 | Freiman et al. ............ 320/157 |
| 5,747,969 A | | 5/1998 | Tamai |
| 5,808,443 A | * | 9/1998 | Lundstrom ............ 320/164 |
| 5,818,203 A | * | 10/1998 | Narita ............ 320/128 |
| 5,847,544 A | | 12/1998 | Eguchi |

(Continued)

FOREIGN PATENT DOCUMENTS

GB 1360089 7/1974

(Continued)

OTHER PUBLICATIONS

Texas Instruments, Datasheets for pq2057, May 2001, p. 1-21.*

(Continued)

*Primary Examiner*—Akm E Ullah
*Assistant Examiner*—Jue Zhang
(74) *Attorney, Agent, or Firm*—Toler Law Group (57) ABSTRACT

A semiconductor device includes an adjustable current source that is coupled to an external battery. The semiconductor device includes a feedback control module that is responsive to a voltage level at the external battery. The feedback control module also has an output that is directed to control the current supplied by the adjustable current source. Also, the feedback control module can selectively provide a signal to periodically and temporarily turn off the current supplied by the adjustable current source. A voltage at the external battery is measured during a time period when the current is turned on and during a time period when the current is turned off. While the current is turned off, the feedback control module can measure the external battery voltage so that it can be compared to the battery voltage while the adjustable current source is on.

19 Claims, 5 Drawing Sheets

U.S. PATENT DOCUMENTS

| | | |
|---|---|---|
| 5,859,524 A | 1/1999 | Ettes |
| 5,949,218 A | 9/1999 | Colles et al. |
| 6,114,838 A * | 9/2000 | Brink et al. ............... 320/136 |
| 6,137,265 A | 10/2000 | Cummings et al. |
| 6,310,461 B1 | 10/2001 | Romao |
| 6,448,743 B2 * | 9/2002 | Sano et al. ................ 320/162 |
| 6,518,726 B1 | 2/2003 | Nowlin, Jr. et al. |
| 6,700,364 B2 | 3/2004 | Barcelo et al. |
| 6,707,272 B1 | 3/2004 | Thandiwe |
| 6,828,764 B2 * | 12/2004 | Takimoto et al. ............ 320/128 |
| 6,850,041 B2 * | 2/2005 | Takano ..................... 320/150 |
| 6,891,352 B2 * | 5/2005 | Miyazaki et al. ............ 320/118 |
| 2002/0000788 A1 * | 1/2002 | Ostergaard et al. ......... 320/128 |
| 2002/0000790 A1 * | 1/2002 | Sano et al. ................ 320/162 |
| 2002/0101218 A1 * | 8/2002 | Koenck et al. ............. 320/140 |
| 2004/0113591 A1 | 6/2004 | Bradley et al. |

FOREIGN PATENT DOCUMENTS

| | | |
|---|---|---|
| GB | 1474137 A | 5/1977 |
| GB | 1480330 A | 7/1977 |
| GB | 2189951 A | 11/1987 |
| GB | 2320142 A | 6/1998 |
| JP | 2003087990 A | 3/2003 |
| WO | WO91/07000 A1 | 5/1991 |
| WO | WO95/02913 A1 | 1/1995 |

OTHER PUBLICATIONS

"Advanced Linear Charge Management IC for Single— and Two-Cell Lithium-ion and Lithuium-Polymer", Texas Instruments Datasheet for bq2057, Revised Jul. 2002, pp. 1-19.

* cited by examiner

SYSTEM, METHOD AND SEMICONDUCTOR DEVICE FOR CHARGING A SECONDARY BATTERY

FIELD OF THE DISCLOSURE

The present disclosure relates generally to systems and methods for charging secondary batteries.

BACKGROUND

Increasingly, the consumer market is demanding portable electronic devices, such as personal digital assistants (PDA), MP3 players, portable storage systems, advanced wireless telephones, cameras, and other handheld devices. Many of these devices can include one or more secondary batteries that can be charged and re-charged during the life of the device. Moreover, many of these electronic devices can include a charging circuit that is electrically coupled to a secondary battery to allow recharging.

Conventional charging circuits can require additional circuitry, such as one or more additional resistors, one or more field effect transistors, etc., that may increase the cost of a portable electronic device. Further, the additional circuitry can reduce the efficiency of charging a secondary battery. Such circuits may consume more than a negligible quantity of power during the charge and thereby, increase the time and power required to recharge the secondary battery.

As such, an improved system and method for charging a secondary battery is desirable.

DETAILED DESCRIPTION OF THE DRAWING(S)

A semiconductor device includes an adjustable current source that is coupled to an external battery. The external battery is responsive to current supplied by the adjustable current source. Further, the semiconductor device includes a feedback control module that is responsive to a voltage level at the external battery. The feedback control module also has an output that is directed to control the current supplied by the adjustable current source. Also, the feedback control module can selectively provide a signal to periodically and temporarily turn off the current supplied by the adjustable current source. A voltage at the external battery is measured during a time period when the current is turned on and during a time period when the current is turned off.

In a particular embodiment, the semiconductor device further includes an analog-to-digital converter that is responsive to a measured voltage at the external battery. Moreover, the semiconductor device includes a processor that is responsive to the analog-to-digital converter. The feedback control module can also be responsive to the processor and the feedback control module can send a stop charging signal to the adjustable current source based on the measured voltage at the battery. In a particular embodiment, the feedback control module periodically and temporarily turns off the current that is supplied by the adjustable current source. While the current is turned off, the feedback control module can measure the external battery voltage so that it can be compared to the battery voltage while the adjustable current source is on. In another particular embodiment, the external battery is a non-aqueous battery, e.g., a lithium ion type battery. The external battery is typically charged to a specific voltage between 4.0 volts and 4.3 volts.

In another embodiment, a system includes a housing that contains a rechargeable battery and a semiconductor device. The semiconductor device includes a processor and a charging circuit. In an illustrative embodiment, the battery charging circuit includes an adjustable current source to supply charge to the rechargeable battery and a feedback control module that has a first input that is responsive to a voltage level at the rechargeable battery and a second input that is responsive to a limit voltage. The feedback control module also has an output that is directed to control the current supplied by the adjustable current source. Further, the feedback control module periodically and temporarily provides a signal to turn off the current supplied by the adjustable current source. A voltage at the rechargeable battery is measured during a time period when the current is turned on and during a time period when the current is turned off.

In yet another embodiment, a method of charging a battery is provided and includes applying a charging current from a semiconductor device to the battery during a first battery charging time period. A charging voltage level is measured at the battery during the first battery charging time period. During a non-charging voltage measurement time interval, the application of the charging current from the semiconductor device to the battery is temporarily stopped. Concurrently, a non-charging voltage level is measured at the battery while the charging current is no longer being applied to the battery.

In still another embodiment, a system is provided and includes a rechargeable battery that is coupled to a semiconductor device. Particularly, the rechargeable battery receives a charging current during a charging cycle. Also, the charging cycle includes a plurality of intermittent no-charge time intervals where the battery receives a significantly reduced charging current from the semiconductor device.

In yet still another embodiment, a method for charging a battery is provided and includes receiving a charging current having a substantially constant value at a terminal of the battery until the voltage at the battery reaches a predetermined level. Thereafter, a charging current that has an exponentially decreasing value at the terminal is received at the battery such that the battery voltage does not exceed the predetermined voltage limit. While the charging current is generally decreasing, the charging current is periodically and temporarily stopped in order to measure the non-charging voltage of the battery.

Figure 1:
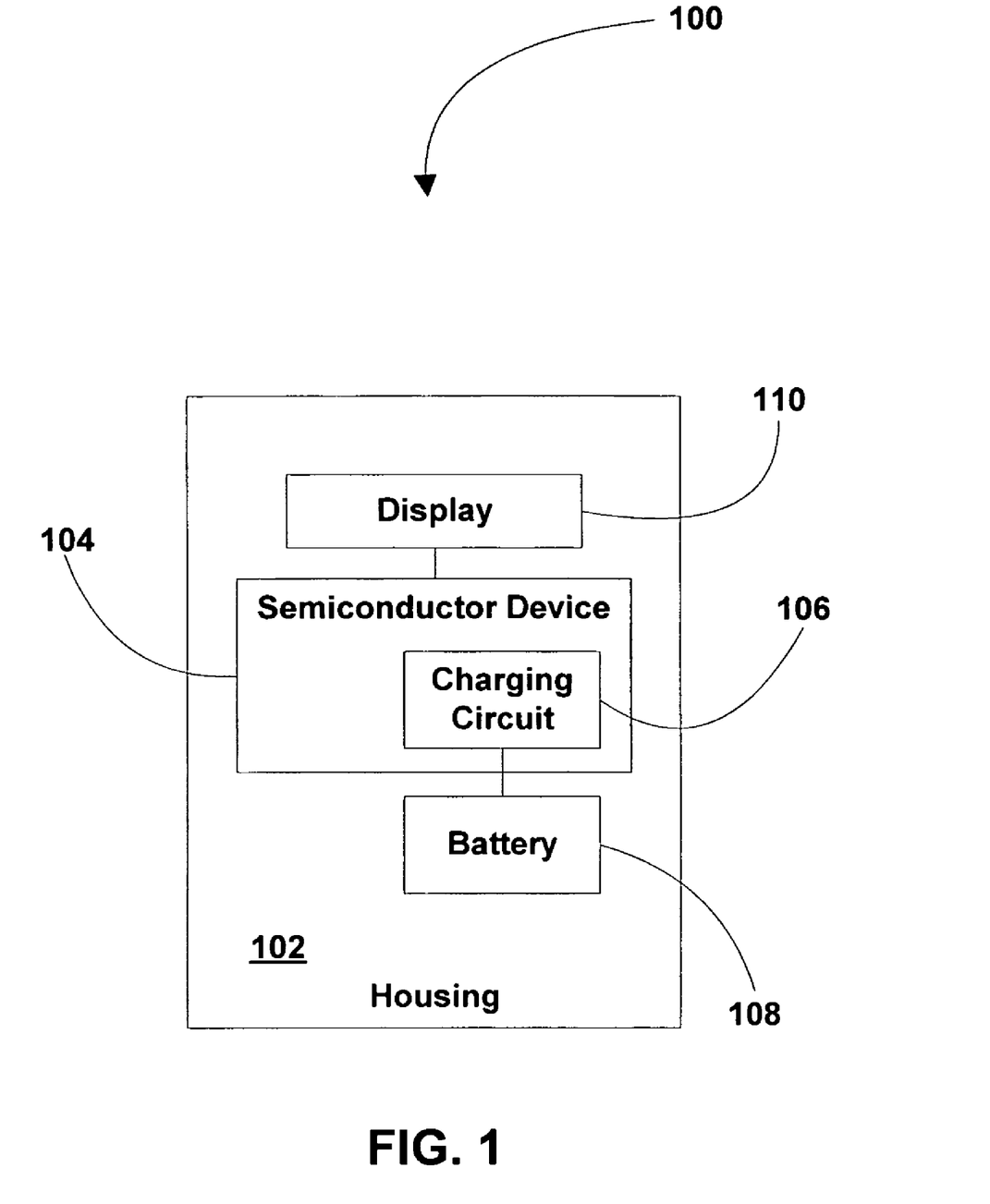
FIG. 1 is a block diagram of a portable electronic device including a secondary battery charging system.

FIG. 1 shows an exemplary, non-limiting embodiment of a secondary battery charging system, designated 100. As illustrated in FIG. 1, the system 100 includes a housing 102 in which a semiconductor device 104 is disposed. In an illustrative embodiment, the semiconductor device 104 is an integrated circuit. A charging circuit 106 can be included on the semiconductor device 104. Further, in an illustrative embodiment, a secondary battery 108, e.g., a non-aqueous battery, is electrically coupled to the charging circuit 106. In a particular embodiment, the non-aqueous battery is a lithium ion battery.

FIG. 1 also indicates that the system 100 can include a display 110 that is responsive to the semiconductor device 104. In a particular embodiment, the display 110 can provide a visual indication to a user of the charging status of the battery 108. For example, the display 110 can indicate the charging status as a percentage, e.g., percentage charged or percentage remaining to be charged. In the alternative, the display 110 can indicate a time remaining to complete a full charge. In a particular embodiment, the display 110 can be a light emitting diode (LED), a liquid crystal display (LCD), or any similar device.

Figure 2:
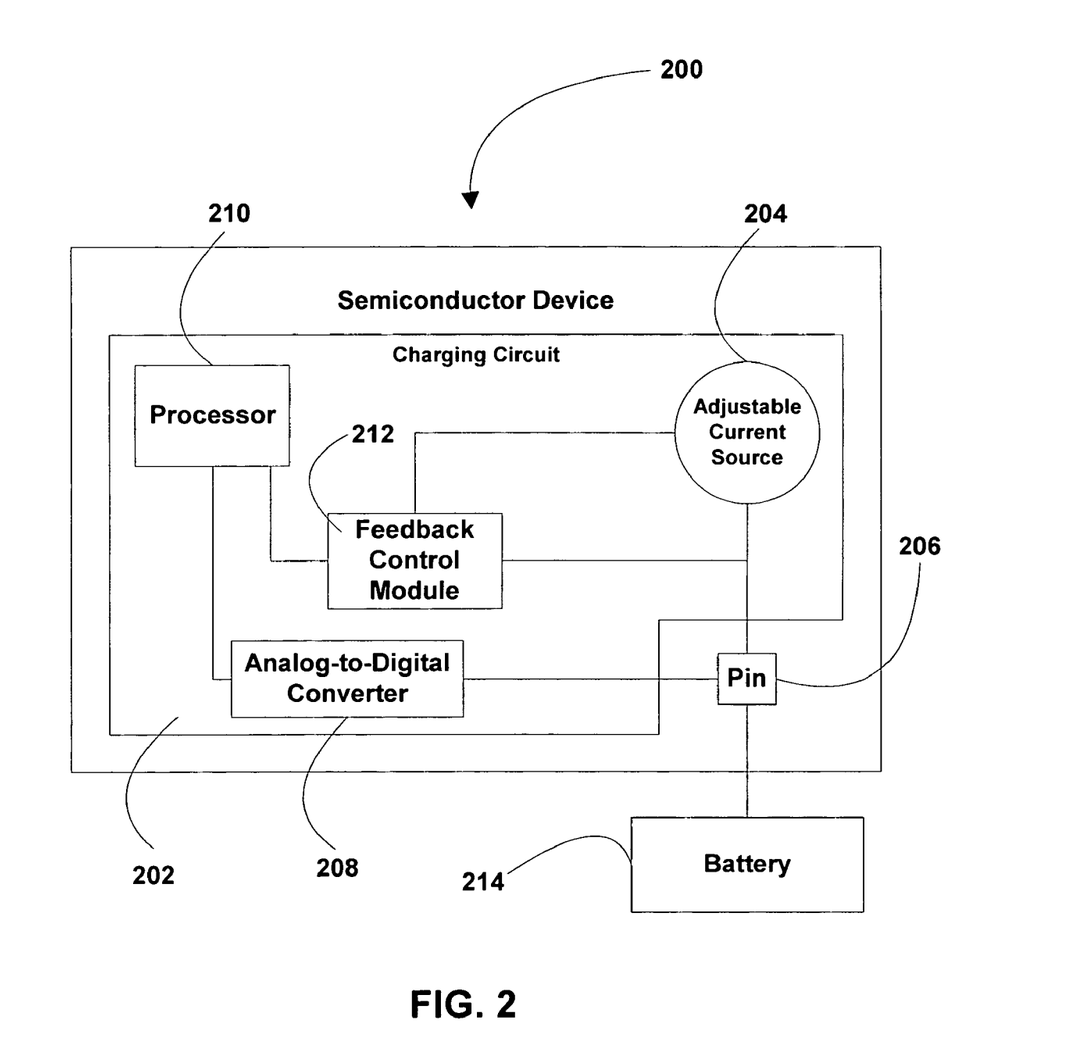
FIG. 2 is a block diagram of a semiconductor device including a charging circuit.

Referring now to FIG. 2, an exemplary, non-limiting embodiment of a semiconductor device including a charging circuit is shown and is generally designated 200. As illustrated in FIG. 2, the semiconductor device 200 includes a charging circuit 202. The charging circuit 202 includes an adjustable current source 204 that is operably coupled to a secondary battery 214 via a pin 206. An analog-to-digital converter (ADC) 208 is also operably coupled to the secondary battery 214 via the pin 206. Further, a processor 210 is coupled to the ADC 208. FIG. 2 also indicates that a feedback control module 212 can be coupled to the processor 210 and the secondary battery 214. The feedback control module 212 is also coupled to the adjustable current source 204.

In an illustrative embodiment, the adjustable current source 204 supplies a charge to the secondary battery 214. Also, the feedback control module 212 receives a signal that indicates the voltage level of the battery 214. In a particular embodiment, the feedback control module 212 controls the adjustable current source 204. For example, when the voltage level of the secondary battery 214 falls below a lower threshold, the feedback control module 212 can cause the adjustable current source 204 to provide a substantially constant current to the secondary battery 214 during a first phase of a charging cycle. Further, when the voltage level of the secondary battery 214 reaches an upper threshold, the feedback control module 212 can cause the adjustable current source 204 to reduce the charging current such that the upper threshold limit voltage is not exceeded.

Periodically, during the second phase of the charging cycle, the adjustable current source 204 is pulsed on and off, i.e., between an energized state wherein a current is supplied to the secondary battery 214 and a de-energized state wherein no current is supplied to the secondary battery 214. When current is supplied to the secondary battery 214, a charging voltage at the secondary battery 214 can be measured. Also, when no current is supplied to the secondary battery 214, a non-charging battery voltage can be measured. Further, when a voltage difference between the charging voltage and the non-charging voltage falls below a threshold, the feedback control module 212 can send a stop charging signal to the adjustable current source 204.

In an illustrative embodiment, during the second phase of the charging cycle, the processor 210 periodically receives a charging voltage value from the secondary battery 214 during the energized state via the ADC 208, and a non-charging voltage value from the secondary battery 214 via the ADC 208. In a particular embodiment, the non-charging voltage value is measured while the charging current from the adjustable current source 204 is temporarily turned off. The processor 210 can use the non-charging voltage value and the charging voltage value in order to determine a voltage difference between such voltage values. Further, by monitoring the voltage difference, the processor 210 can indicate to the feedback control module 212 when to end the charging cycle.

Figure 3:
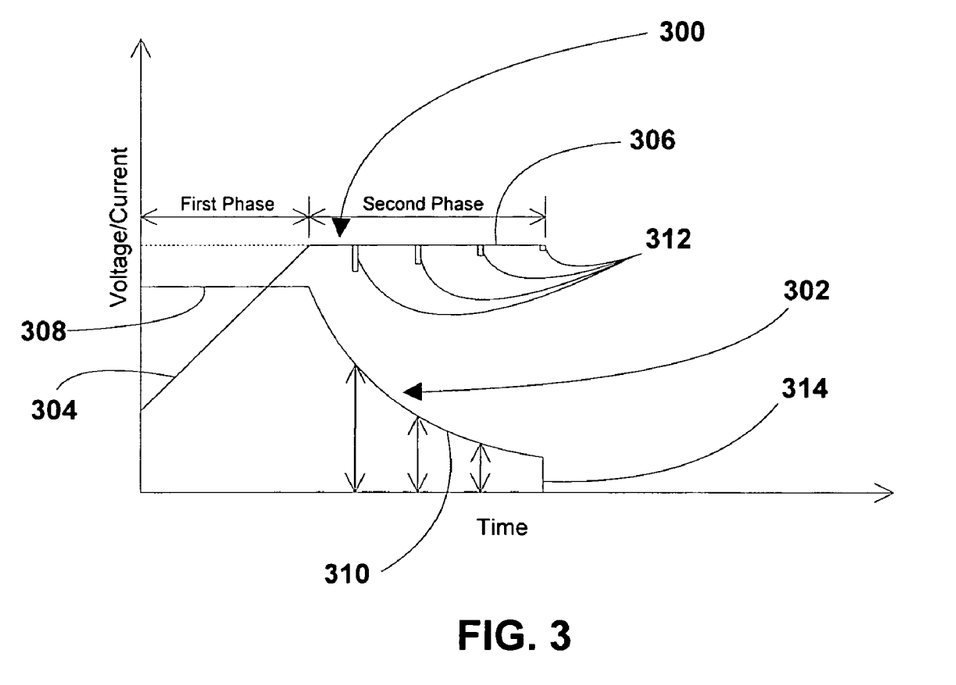
FIG. 3 is a graph that illustrates a voltage and current applied by a charging circuit to a secondary battery during a charging cycle plotted versus time.

FIG. 3 depicts a graph of a battery voltage and a charging current plotted versus time. Specifically, the graph includes battery voltage data line 300 and charging current data line 302. In a particular embodiment, the battery voltage data line 300 includes a first portion 304 that has a slope that is generally increasing and indicates that the battery voltage is increasing. Further, the battery voltage data line 300 includes a second portion 306 that has a slope that is generally constant indicating a constant battery voltage. As illustrated in FIG. 3, the charging current data line 302 includes a first portion 308 that has a substantially constant slope to indicate a constant charging current. Further, the charging current data line 302 includes a second portion 310 that has a slope that is generally decreasing and indicates that the charging current is decreasing.

In a particular embodiment, the first portion 308 of the charging current data line 302 coincides with the first portion 304 of the battery voltage data line 300 and represents a first phase of a battery charging cycle. During the first phase of the charging cycle, the charging current remains substantially constant while the battery voltage increases. Also, in a particular embodiment, the second portion 306 of the battery voltage data line 304 coincides with the second portion 310 of the charging current data 310 and represents a second phase of the charging cycle. During the second phase of the charging cycle, the charging current decreases while the battery voltage remains substantially constant. In an illustrative embodiment, the transition for each data line 300, 302 from the first portion 304, 308 to the second portion 306, 310 occurs when the battery voltage reaches an upper voltage threshold value, e.g., between 4.0 volts and 4.3 volts.

FIG. 3 further shows a plurality of negative voltage spikes 312 that occur during a plurality of intermittent no-charge time intervals that occur during the second phase of the charging cycle while the charging current is decreasing exponentially. Each negative voltage spike 312 represents a voltage difference between a charging voltage value measured when the current is applied to the secondary battery 214 (FIG. 2) and a non-charging voltage value measured when no current is applied to the secondary battery 214 (FIG. 2). As the second portion 310 of the charging current data line 302 decreases, the size of the negative voltage spikes 312 also decrease. Accordingly, when the size of one of the voltage spikes 312 falls below a predetermined threshold the current applied to the secondary battery 214 (FIG. 2) may be turned off at a stop charging point 314. Moreover, at the stop charging point 314, the secondary battery 214 (FIG. 2) can be considered fully charged.

Figure 4:
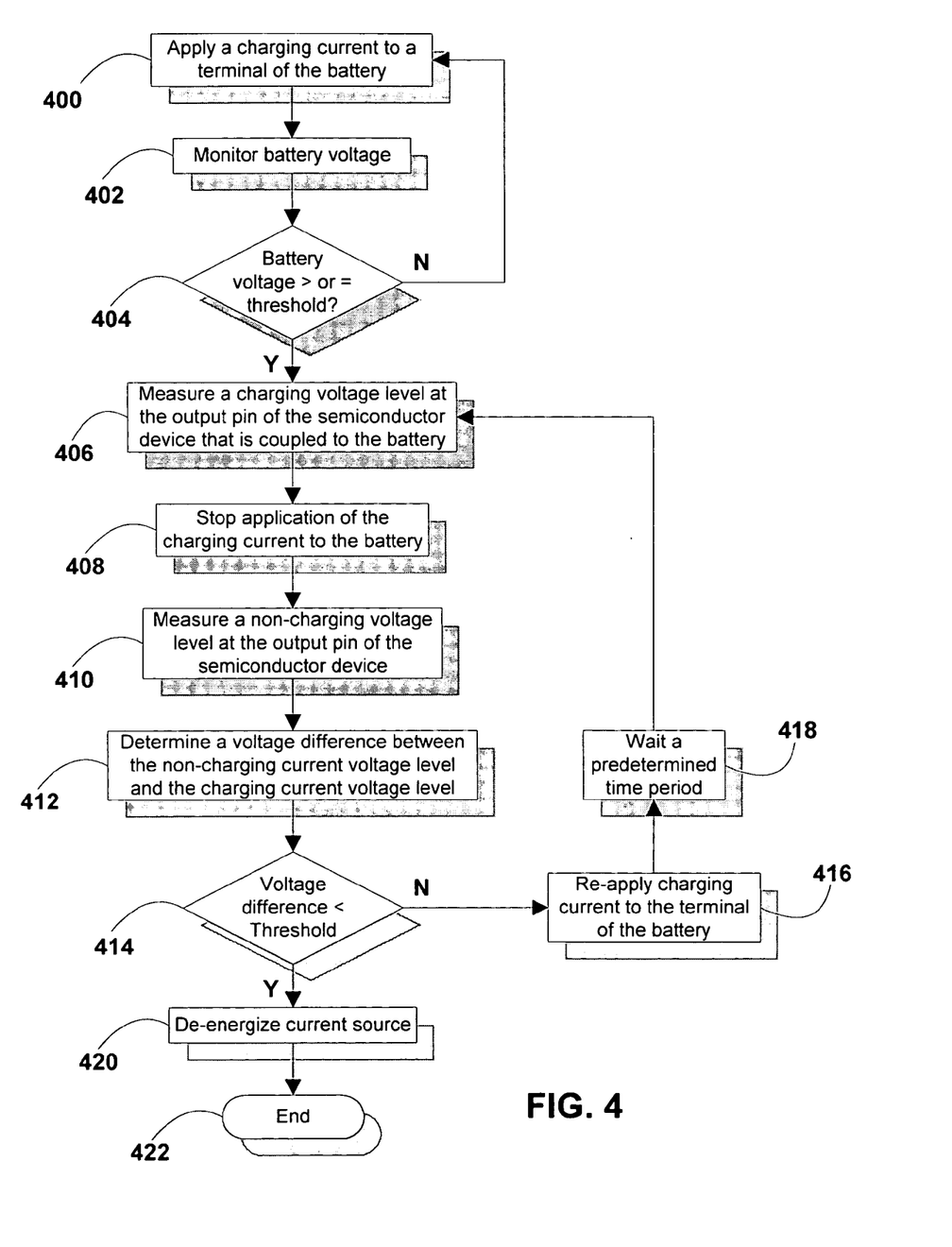
FIG. 4 is a flow chart illustrating a method for charging a secondary battery.

Referring now to FIG. 4, an exemplary, non-limiting embodiment of a method for charging a secondary battery is shown and commences at block 400. At block 400, a voltage limited charging current is applied to a terminal of a secondary battery, e.g., the secondary battery 214 shown in FIG. 2. In a particular embodiment, the voltage limit is less than or equal to 4.3 volts, e.g., approximately 4.2 volts or approximately 4.1 volts. At block 402, a battery voltage is monitored. Moving to decision step 404, a determination is undertaken in order to ascertain whether the battery voltage is greater than a threshold, e.g., an upper threshold. The threshold is typically selected to be slightly lower (1-5%) than the voltage limit setting. If the battery voltage is below the threshold, the logic returns to block 400 and the voltage limited charging current continues to be applied to the secondary battery 214.

At decision step 404, if the battery voltage is greater than or equal to the threshold, the logic proceeds to block 406 wherein a charging voltage level at the secondary battery 214 (FIG. 2) is measured. Proceeding to block 408, the application of the charging current to the secondary battery 214 (FIG. 2) is stopped. At block 410, a non-charging voltage level at the secondary battery 214 (FIG. 2) is measured. Moving to block 412, a voltage difference between the non-charging voltage level and the charging voltage level is determined, e.g., by the processor 210 (FIG. 2).

Next, at decision step 414, a decision is made in order to determine if the voltage difference is less than a lower threshold. If the voltage difference is not lower than the threshold, the logic moves to block 416 and the voltage limited charging current is re-applied to the terminal of the secondary battery 214 (FIG. 2). Thereafter, at block 418, the logic waits a predetermined time period, e.g., a set period that is typically 5 to 30 seconds, before returning to block 406 and continuing as described above.

Accordingly by waiting a period of time, the logic provides a scheme in which the current applied to the secondary battery 214 (FIG. 2) is periodically pulsed on and off by the feedback control module 212 (FIG. 2) and each time the current is turned off the non-charging voltage at the battery 214 (FIG. 2) is measured, e.g., by the ADC 208 (FIG. 2), the feedback control module 212 (FIG. 2), the processor 210 (FIG. 2), or a combination thereof. Returning to decision step 414, if the voltage difference is less than the predetermined threshold, the logic proceeds to block 420 and the adjustable current source 204 (FIG. 2) is de-energized, and the charge cycle of the battery 214 (FIG. 2) is complete. The logic then ends at state 422.

Figure 5:
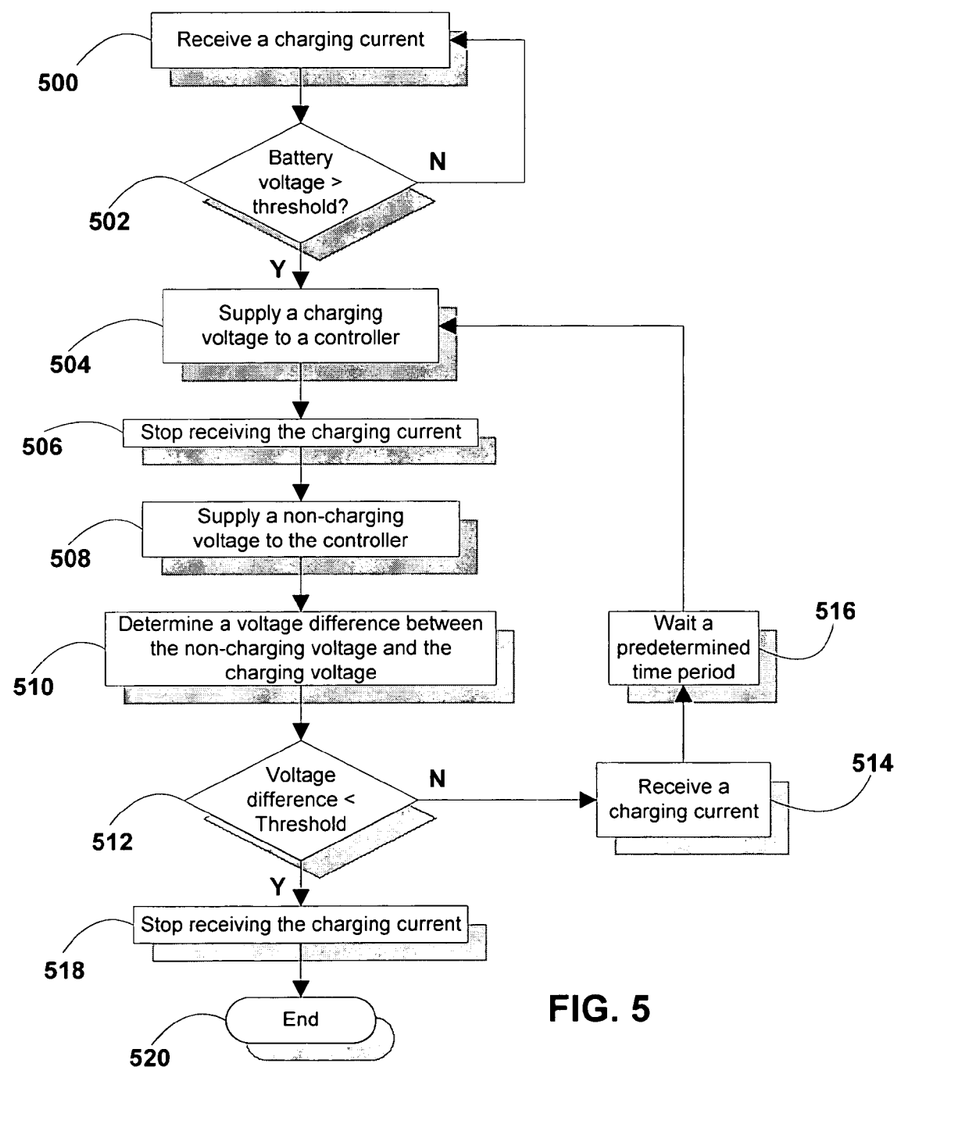
FIG. 5 is a flow chart illustrating a method for receiving a charge at a secondary

FIG. 5 depicts an exemplary, non-limiting, alternative embodiment of a method for receiving a charge at a secondary battery, e.g., the secondary battery 214 shown in FIG. 2. Commencing at block 500, a voltage limited charging current is received by the secondary battery 214 (FIG. 2). Next, at decision step 502, a determination is made in order to ascertain whether a battery voltage is above a threshold, e.g., an upper threshold. If not, the logic returns to block 500 and the charging current continues to be received by the secondary battery 214 (FIG. 2).

If the battery voltage is above the threshold, the logic moves to block 504, and a charging voltage is supplied to a controller, e.g., the processor 210 shown in FIG. 2, where it can be measured. In a particular embodiment, the charging voltage is supplied to the controller via the ADC 208 (FIG. 2). At block 506, the reception of the charging current at the battery 214 (FIG. 2) is temporarily stopped. Moving to block 508, a non-charging voltage is supplied to the controller. At block 510, a voltage difference between the non-charging voltage level and the charging voltage level is determined by the controller. Next, at decision step 512, it is determined whether the voltage difference is less than a threshold.

If the voltage difference is not less than the threshold, the logic moves to block 514 and a voltage limited charging current is again received at the secondary battery 214 (FIG. 2). Proceeding to block 516, the logic waits a predetermined time period before returning to block 504 and continuing as described above. Accordingly, the secondary battery 214 (FIG. 2) receives current that periodically pulses between an on state and an off state while it is steadily decreasing, e.g., due to the voltage limiter. In a particular embodiment, the time period is 5 to 30 seconds. Returning to decision step 512, if the voltage difference is less than the threshold, the logic proceeds to block 518 and the secondary battery 214 (FIG. 2) stops receiving the charging current since the battery 214 (FIG. 2) is fully charged. The logic ends at state 520.

With the configuration of structure described above, the system and method disclosed provides a means for efficiently charging a secondary battery within an electronic device, e.g., an MP3 player, a walkie-talkie, a portable CD player, a cordless phone, etc. Specifically, during a charge cycle, the secondary battery is charged with a constant current until an upper battery voltage threshold is reached. Thereafter, the current source is pulsed on and off while voltage limited such that the current is steadily decreasing. When the current source is in an off state, a non-charging battery voltage is measured to compare to a charging voltage. When a voltage difference between the charging voltage and the non-charging voltage falls below a lower threshold, the current source is turned off completely until the non-charging battery voltage falls below a lower threshold that would indicate that a new charge cycle is required.

In an illustrative embodiment, the charging circuit disclosed obviates the need for one or more extra resistors associated with a conventional voltage or current measurement.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A semiconductor device comprising:
   an adjustable current source;
   an interface to an external battery, the interface coupled to the adjustable current source, the external battery responsive to current supplied by the adjustable current source via the interface;
   a feedback control module having a first input responsive to a voltage level at the external battery and a second input responsive to a limit voltage, and having an output directed to control the current supplied by the adjustable current source; and
   wherein the feedback control module is configured to operate in a first phase of a charging cycle in which a constant current is applied to the external battery from the start of charging to when an upper threshold voltage level of the external battery is reached without tinning off the constant current, and wherein the feedback control module is configured to operate in a second phase of a charging cycle wherein the feedback control module selectively provides a signal to turn off the current supplied by the adjustable current source, wherein a first voltage at the external battery is measured during a time period when the current is turned on and a second voltage at the external battery is measured during a time period when the current is turned off, and wherein the feedback control module provides the signal to turn off the current when a difference between the first voltage and the second voltage is less than a threshold value.

2. The semiconductor device of claim 1, further comprising an analog-to-digital converter responsive to the voltages measured at the external battery.

3. The semiconductor device of claim 2, further comprising a processor responsive to the analog-to-digital converter.

4. The semiconductor device of claim 3, wherein the feedback control module is responsive to the processor and wherein the feedback control module sends a stop charging signal to the adjustable current source when the processor determines that the difference is less than the threshold value.

5. The semiconductor device of claim 1, wherein the feedback control module turns off the current supplied by the adjustable current source.

6. The semiconductor device of claim 1, wherein the feedback control module turns off the current supplied by the adjustable current source and measures the second voltage at the external battery when the current is periodically turned off by the feedback control module.

7. The semiconductor device of claim 1, wherein the external battery is a non-aqueous battery.

8. The semiconductor device of claim 7, wherein the external battery is a lithium ion type battery.

9. The semiconductor device of claim 1, wherein the external battery is charged to a voltage between 4.0 volts and 4.3 volts.

10. The semiconductor device of claim 9, wherein the external battery is charged to about 4.2 volts.

11. The semiconductor device of claim 9, wherein the external battery is charged to about 4.1 volts.

12. A system comprising:
a housing;
a rechargeable battery within the housing;
a semiconductor device within the housing, the semiconductor device including a processor and a battery charging circuit, wherein the battery charging circuit comprises:
an adjustable current source to supply charge to the rechargeable battery; and
a feedback control module having a first input responsive to a voltage level at the rechargeable battery and a second input responsive to a limit voltage, and having an output directed to control the current supplied by the adjustable current source;
wherein the feedback control module is configured to operate in a first phase of a charging cycle in which a constant current is applied to the rechargeable battery from the start of charging to when an upper threshold voltage level of the rechargeable battery is reached without turning off the constant current, and wherein the feedback control module is configured to operate in a second phase of a charging cycle wherein the feedback control module selectively provides a signal to turn off the current supplied by the adjustable current source when a voltage difference between a first voltage at the rechargeable battery that is measured during a time period when the current is turned on and a second voltage at the rechargeable battery that is measured during a time period when the current is turned off is less than a predetermined threshold value.

13. The system of claim 12, wherein the battery charging circuit further comprises an analog-to-digital converter.

14. The system of claim 13, wherein the battery charging circuit further comprises a processor responsive to the analog-to-digital converter.

15. The system of claim 14, wherein the feedback control module is responsive to the processor and wherein the feedback control module sends a stop charging signal to the adjustable current source when the processor determines that the voltage difference is less than a predetermined threshold value.

16. The system of claim 12, wherein the feedback control module turns off the current supplied by the adjustable current source.

17. The system of claim 12, wherein the rechargeable battery is a lithium ion type battery.

18. The system of claim 12, wherein the rechargeable battery is charged to a voltage between 4.0 volts and 4.3 volts.

19. The system of claim 18, wherein the rechargeable battery is charged to about 4.2 volts.

* * * * *